July 14, 1970  J. A. WOHLFEIL  3,520,228
SPINDLE ORIENTING AND DRAWBOLT MALFUNCTION SENSING
MACHINE TOOL CONTROL SYSTEM
Filed April 10, 1967  6 Sheets-Sheet 1
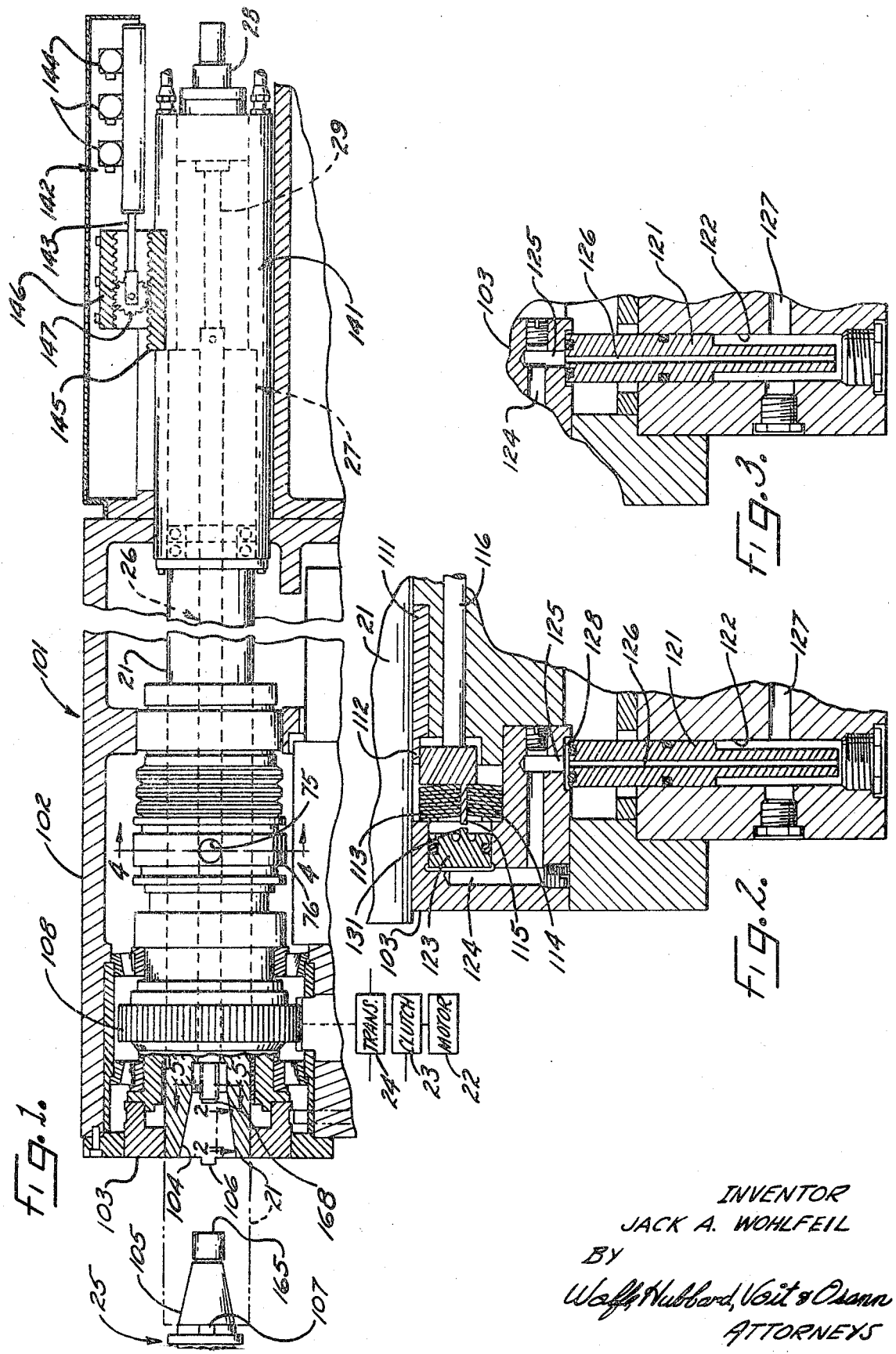
INVENTOR
JACK A. WOHLFEIL
BY
Woolf, Hubbard, Voit & Osann
ATTORNEYS INVENTOR
JACK A. WOHLFEIL
BY
Wolff, Hubbard, Voit & Osann
ATTORNEYS

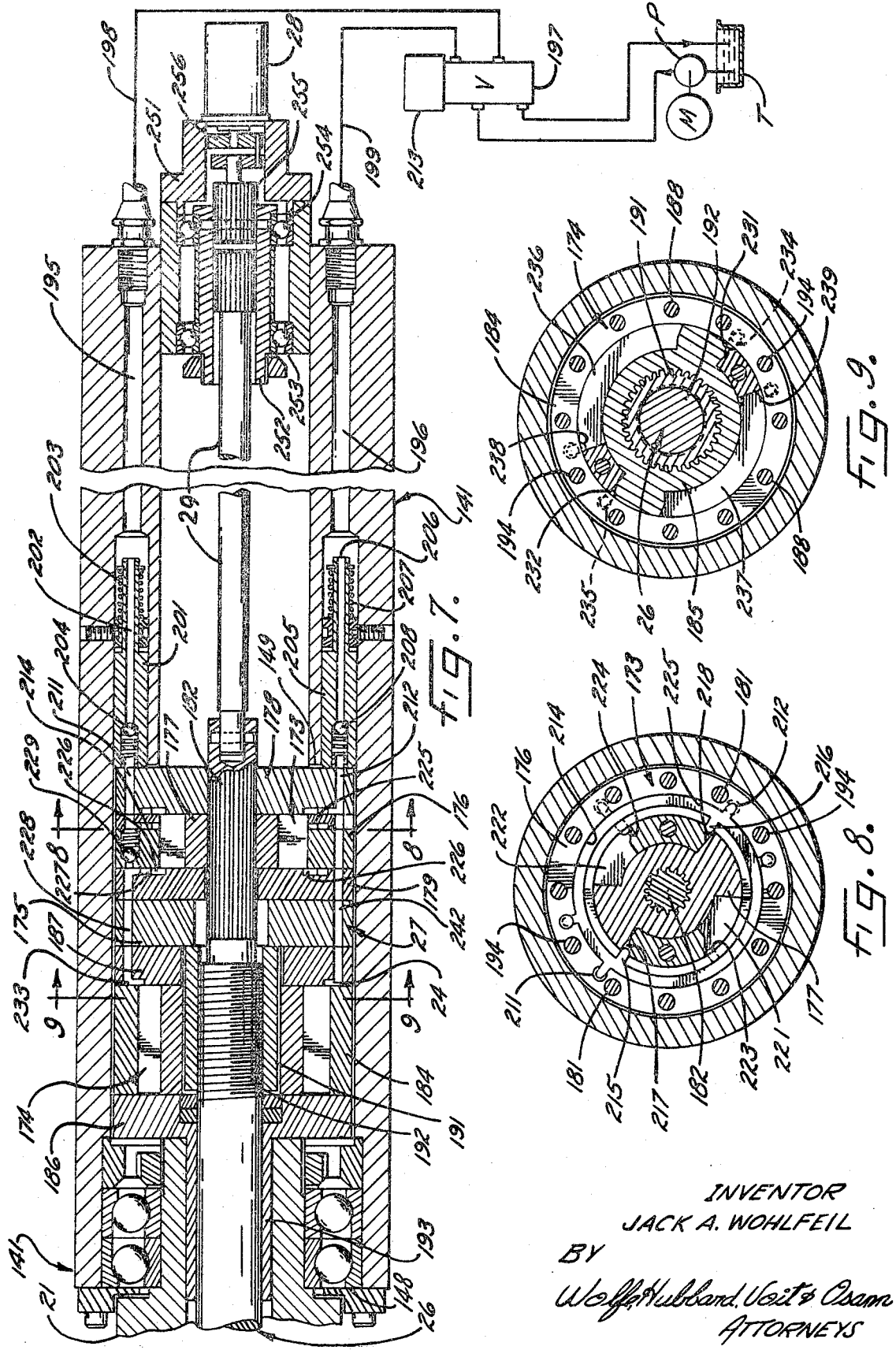

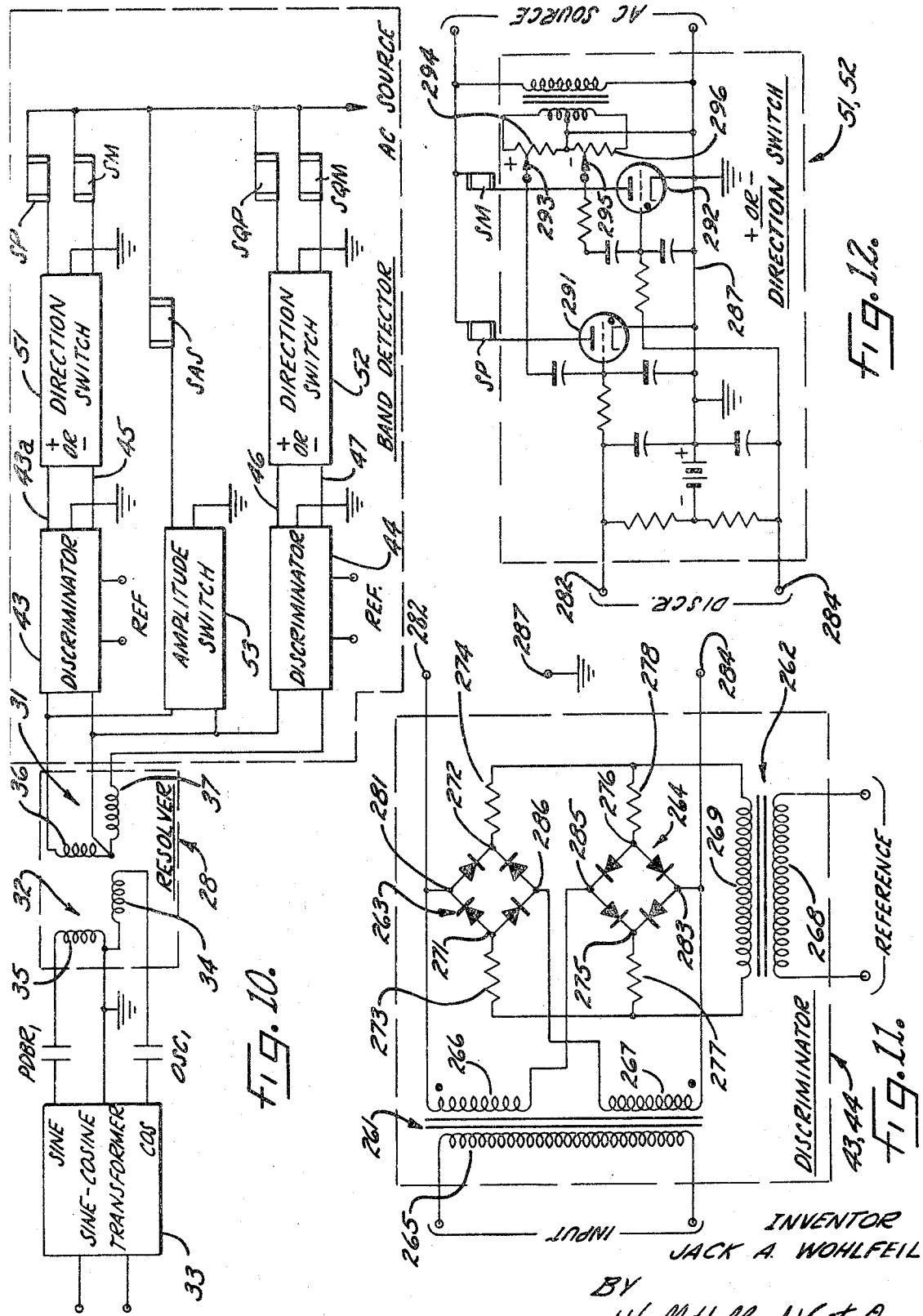

3,520,228
Patented July 14, 1970

3,520,228
SPINDLE ORIENTING AND DRAWBOLT MALFUNCTION SENSING MACHINE TOOL CONTROL SYSTEM
Jack A. Wohlfeil, Fond du Lac, Wis., assignor to Gidding & Lewis, Inc., Fond du Lac, Wis., a corporation of Wisconsin
Filed Apr. 10, 1967, Ser. No. 629,585
Int. Cl. B23c 1/06
U.S. Cl. 90—11                    22 Claims

ABSTRACT OF THE DISCLOSURE

A machine tool control system with control circuits for arresting rotation of a machine tool spindle in a fixed rotary orientation position where a drawbolt used to secure worktools in the spindle is rotatable relative to the spindle to release one worktool and grip another and control circuit for sensing any failure of the drawbolt to properly rotate relative to the spindle. The same rotary position transducer provides signals representing (1) drawbolt rotary position, and, when the spindle is rotating, (2) spindle rotary position and (3) spindle rotary speed, and such signals are utilized in the control circuits both to delay actuation of the spindle arresting mechanism until the spindle arrives at the orientation position below a predetermined creep speed and to sense any failure of the drawbolt to rotate properly relative to the spindle.

BACKGROUND OF THE INVENTION

The present invention relates to machine tool control systems and, more particularly to command responsive control systems for orienting and controlling machine tool spindles and drawbolts used to secure worktools in the spindles.

It is an object of this invention to provide a control system which is actuable both to arrest the rotation of a machine tool spindle in a predetermined rotary orientation position and to sense the failure of a drawbolt in the spindle to rotate in a prescribed way.

Another object is the provision of such a control system where the maximum applied shock attendant to arresting rotation of the spindle is limited to a safe level. A related, more specific object is to provide a control system for actuating the spindle drive transmission responsive to a spindle orient command to provide spindle rotation at a predetermined relatively low creep speed and for preventing actuation of a spindle arresting mechanism when the spindle rotation is above the creep speed.

A detailed object of the invention is to provide a control system for orienting the spindle and sensing malfunction of the drawbolt in presently existing machine tools of the type that employ a power operated drawbolt to secure a worktool in the spindle.

Other objects and advantages of the present invention will become apparent upon reading the following detailed description with reference to the drawings in which:

DESCRIPTION OF THE DRAWINGS

FIG. 1 is a fragmentary vertical section taken along the longitudinal axis of the headstock with the toolholder being shown aligned with, but withdrawn from, the drawbolt in the interest of clarity;

FIG. 2 is an enlarged fragmentary section taken approximately along the line 2—2 of FIG. 1 to show the mechanism for clamping the spindle within the spindle sleeve;

FIG. 3 is a fragmentary section showing parts found in FIG. 2 in the position they assume when the clamp is released so as to permit longitudinal translation of the spindle with respect to the sleeve;

FIG. 7 is an enlarged fragmentary section of the righthand portion of the structure shown in FIG. 1 to illustrate the drawbolt actuating mechanism and the mechanical linkage between the drawbolt and the rotary position mechanical to electrical transducer;

FIG. 8 is a section taken along the line 8—8 of FIG. 7 to illustrate the motor for rotating the drawbolt with respect to the spindle;

FIG. 9 is a section taken along the line 9—9 of FIG. 7 to illustrate the means for axially translating the drawbolt with respect to the spindle;

FIG. 10 is partly a schematic and partly a block diagram to illustrate the relationship between the rotary position transducer and the band detector;

FIG. 11 is a circuit diagram of the discriminators shown in FIG. 10;

FIG. 12 is a circuit diagram of the plus or minus amplitude switches shown in FIG. 10;

Figure 5:
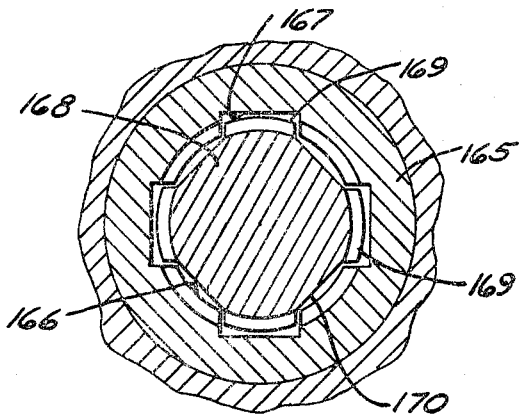
FIG. 5 is a fragmentary section taken along the line 5—5 of FIG. 1 with the toolholder seated in the drawbolt socket during an initial stage of engagement with the drawbolt.

While the invention will be described in connection with a particular embodiment, it will be understood that there is no intent to limit it to that embodiment. On the contrary, the intent is to cover all alternatives, modifications and equivalents as may be included within the spirit and scope of the invention as defined by the appended claims.

GENERAL DESCRIPTION OF THE INVENTION

The present invention is especially, but not solely, applicable to a spindle for a machine tool having automatic means for changing worktools in the spindle, and also having a power actuated drawbolt of the type disclosed in Daugherty Pat. No. 3,254,567 which requires limited angular rotation relative to the spindle to release a tool and return rotation through the same limited angle. In the present case the spindle is arrested in a particular rotary position in response to an orientation command. Thereafter, the power drawbolt is actuated either to engage or to release a tool. The present invention provides transducer means for determining spindle rotary position for the orientation operation, and once the spindle is arrested, for determining drawbolt rotary position relative to the spindle, both before and after actuation for control of the drawbolt signals and to prevent its malfunction. The control system of this invention is also effective to provide the operator with a warning or, preferably, to shut down the machine tool and auxiliary equipment such as the tool changer in response to such a malfunction. Otherwise failure of the drawbolt to properly engage or disengage a worktool might cause serious injury to the machine tool, auxiliary equipment, worktool, workpiece and operator. Thus, as will become clearer hereinafter, the control system of the present invention is effective responsive to command signals to orient the spindle, to cycle the drawbolt, to sense drawbolt malfunction, and responsive to any such malfunction to direct the machine tool in its operation. Furthermore, one of the main features of this invention is to utilize the same transducer means, and much of the same circuitry, to sense both spindle rotary position and drawbolt rotary position and to direct the machine tool operations.

A machine tool of the type described includes, as shown in FIG. 1, a spindle 21 driven by a motor 22 through an electrically disengageable clutch 23 and an electrically controllable multi-speed transmission 24. The automatic tool change equipment is not shown, however it should be apparent that the machine tool headstock illustrated is suited for use with such equipment.

To secure a worktool carrying toolholder 25 in the spindle, there is provided a drawbolt 26 which is rotatable with the spindle during the machining mode of operation and with respect to the spindle during the tool changing phase of the machine tool operation. To release a toolholder, the particular drawbolt shown requires rotation in one direction through an angle of approximately 45 degrees relative to the spindle and to grip a subsequently presented toolholder, the drawbolt requires rotation back in the opposite direction the same 45 degrees. Power and proper sequencing for this drawbolt rotation is provided by a hydraulic motor mechanism 27 which is actuable when the spindle is fixed in the rotary orientation position.

In accordance with the present invention, the information necessary to automatically fix the spindle 21 in the rotary orientation position and to sense a drawbolt malfunction is provided by a rotary position transducer 28 which is coupled to the drawbolt 26 through a mechanical coupling including a drawbolt extension shaft 29. In this exemplary embodiment of the invention, the rotary position transducer 28 takes the form of a two phase resolver (FIG. 10) with a rotor 31 which is rotated with a drawbolt. As a result of being rotated with the drawbolt, the rotary position of the rotor provides mechanical information during the machining mode of operation as to the rotary position of the spindle and during the tool changing mode of operation as to the rotary position of the drawbolt relative to the spindle.

(1) Transducer means

To convert this mechanical information to electrical information appropriate for processing by the circuitry to be described, the stator 32 of the resolver, which is in this case fixed to the headstock, is suitably energized from a sine-cosine transformer 33 connected to a source of carrier frequency signals (not shown). The cosine output of the transformer 33 is connected across a first stator input winding 34 through a pair of normally open contacts $OSC_1$ while the sine output of the transformer is connected across a second stator input winding 35 through a normally open contact set $PDBR_1$.

Assuming now that the spindle is rotating and it is desired to arrest it in the rotary orientation position, the process is initiated, either manually or in accordance with a predetermined program, by supplying a spindle orient command which causes a relay (not shown) to be energized thereby closing contacts $OSC_1$ to energize the stator winding 34. As a result, amplitude modulated carrier frequency signals are produced across the rotor windings, 36 and 37, respectively. These windings are in space quadrature and, consequently, the modulation envelopes of the signals induced therein are displaced from one another in phase by substantially 90 electrical degrees, and the A.C. signal induced in each rotor winding has a magnitude proportional to the angular displacement of the rotor axis and a sense indicative of the direction of that displacement. Moreover, since the spindle and drawbolt are jointly rotating the envelope amplitude characteristic of the signal from each winding is representative of the spindle rotary position while the envelope frequency characteristic indicates the spindle rotary speed.

In order to actuate a spindle locking mechanism when the spindle is in the predetermined rotary orientation position, say 360 degrees relative to a preset reference position of 0 degree, the signals produced across the rotor windings 36 and 37 are applied as control inputs to a band detector characterized by a unique response to rotor rotation through a band about the orientation position.

(2) Spindle rotary speed and position sensing (a) Band detector

In keeping with the invention, to eliminate the danger of damage to the locking mechanism which is present if it is actuated when the spindle is rotating at a relatively high machine speed, the actuation of the locking mechanism is delayed until after the spindle has first slowed to at most a relatively low creep speed. To this end, the band detector is further characterized by a unique response to rotation through a band about a point slightly ahead of the orientation position, and the time of this response is used to determine whether or not the spindle rotational speed is at least as low as the creep speed. To reduce the spindle orienting time, the creep speed check point sould be as close as possible to the orientation position. Thus, the creep speed check point in the embodiment illustrated is 90 degrees ahead of the orientation position. In carrying out this feature of the invention, to further reduce the spindle orienting time in the illustrated embodiment, the spindle speed is reduced in two steps; first to an intermediate speed and then to the creep speed. To this end, the band detector is further characterized by a unique response to rotor rotation through a band about 180 degrees ahead of the orientation position and the length of time of this response is used to determine whether or not the spindle rotation is at least as low as the intermediate speed. The benefit of this two step speed reduction can be seen by observing that with a one step reduction, to say a 12 r.p.m. creep speed, the spindle might rotate for a maximum of almost 1¼ revolutions at 12 r.p.m. before actuation of the locking mechanism whereas with a two step reduction, the spindle rotates at most 1 turn at the higher intermediate speed, typically 24 r.p.m., ¼ turn at the creep speed, and ¼ turn at an average speed of 18 r.p.m. between the intermediate and creep speed checking points assuming that the momentum of the spindle and its drive would cause the spindle to rotate at that average speed for that period. In terms of time, assuming the intermediate and creep speeds mentioned, the two step reduction results in a maximum orientation time more than 2 seconds less than the maximum orientation time with a one step reduction to creep speed.

Figure 14:
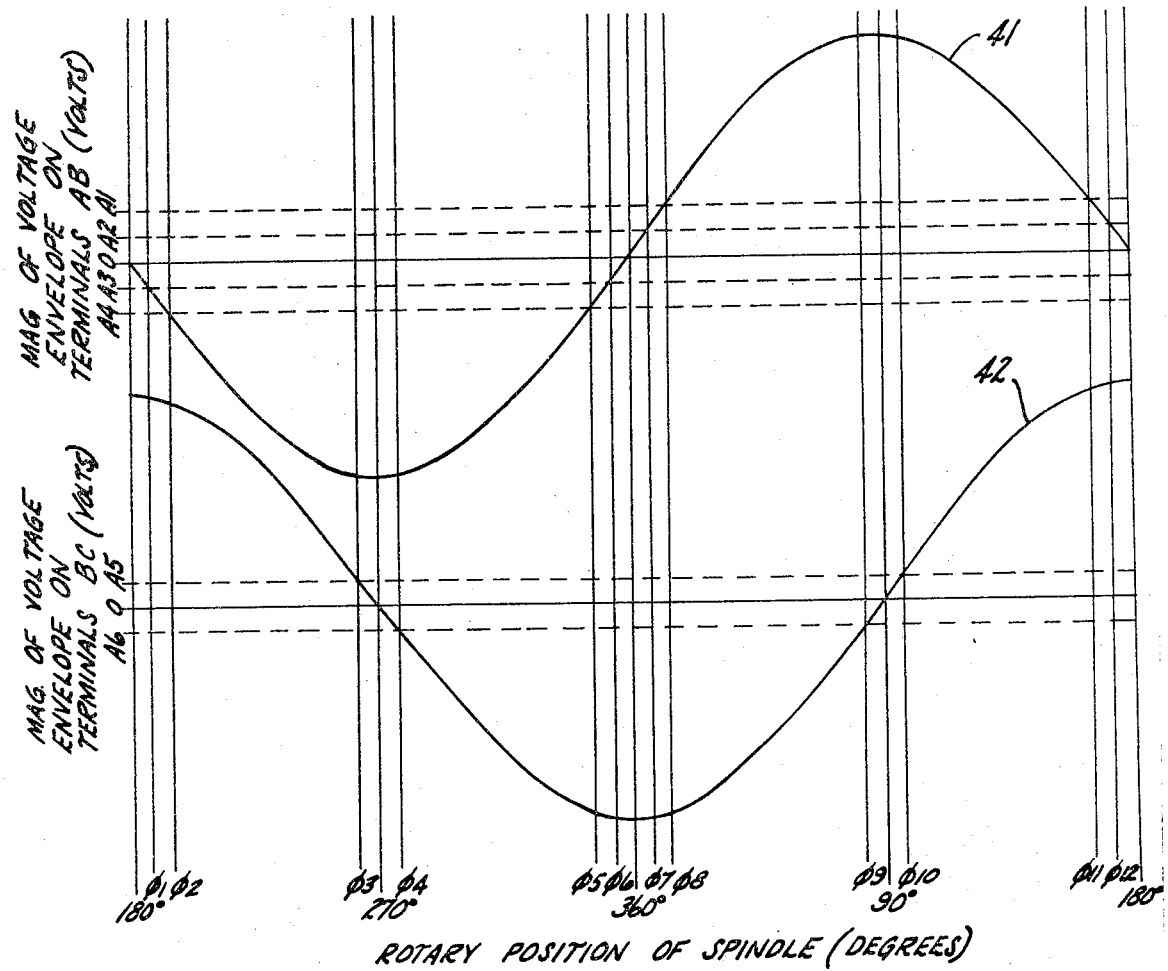
FIG. 14 shows the information bearing envelopes of the waveforms produced by the rotary position transducer of FIG. 10.

To provide the unique responses of the band detector, the relays SP, SM, SAS are responsive to certain characteristics of the signal from the first rotor winding 36 while the relays SQP and SQM are responsive to certain characteristics of the signals from the second rotor winding 37. Specifically, referring to FIG. 14, the relay SP is energized whenever the positive half cycle of the envelope of the signal from the first rotor winding 36 is above the positive threshold level $A_2$, the relay SM is energized so long as the negative half cycle of that signal is below the negative threshold level $A_3$, and the relay SAS is energized whenever that signal has an amplitude greater than the positive threshold level $A_1$ or less than the negative threshold level $A_4$. Further, the relay SQP is energized so long as the signal from the second rotor winding 37 is above the threshold level $A_5$, and the relay SQM is energized whenever that signal from the winding 37 is below the negative threshold level $A_6$. Thus, as can be seen by inspection of FIG. 14, the simultaneous de-energization of the relays SP, SM and SQP unambiguously identifies a band about the 360 degree orientation position, the width of the band being determined by the setting of threshold levels $A_2$ and $A_3$. Similarly, the simultaneous de-energization of the relays SM, SQP and SQM uniquely identifies a band about the 90 degree creep speed check point with the width of the band being governed by the threshold levels $A_5$ and $A_6$. Likewise, the band about the 180 degree intermediate speed check point is unambiguously identified by the energization of the relay SQP with the concurrent de-energization of relay SAS, the bandwidth being established by the threshold levels $A_1$ and $A_4$.

In connection with the use of the relay SAS, it should be noted that the intermediate speed check band about 180 degrees could be identified by the operation of the relays SP and SM with either of the relays SQP and SQM. owever, since the energization threshold levels of the relays SP and SM are relatively low to provide the desired precision in the identification of the rotary orientation position, the bandwidth of the intermediate speed check band would be quite small thereby requiring a very sensitive intermediate speed timer to distinguish between speeds slightly above and below the predetermined intermediate speed. The use of the relay SAS eliminates this problem since its energization threshold levels have no connection with the identification of the orientation position and can therefore be selected solely on the basis of the sensitivity of the intermediate speed timer.

To selectively energize the relays for the above described portions of each revolution of the resolver rotor 31, the first rotor winding 36 and the second rotor winding 37 are connected to first inputs of respective discriminators 43 and 44. The second inputs of the discriminators are each connected to a source of carrier frequency reference signals (not shown) equal in amplitude to the carrier frequency signals applied to the input of the transformer 33. The discriminator 43 removes the carrier from the signal from the first rotor winding 36 and supplies the positive half cycle of the envelope 41 to the output 43a and the inverted negative half cycle of the envelope 41 to the output 45. In a similar manner the discriminator 44 supplies the positive half cycle of the discriminated signal 42 from the second rotor winding 37 to the output 46 and the inverted negative half cycle of the signal 42 to the output 47.

To establish the desired threshold levels, the outputs of the discriminator 43 are applied as control inputs to the respective channels of a dual channel plus or minus direction switch 51. The upper channel of the switch 51 is included in the energization circuit of the relay SP and serves to maintain this circuit open until the positive half cycle control input rises above the threshold level $A_2$ while the lower channel is positioned in the energization circuit of the relay SM to maintain this circuit open until the inverted negative half cycle control input raises above a level corresponding to the threshold level $A_3$. In a like manner, the outputs of the discriminator 44 are applied as control inputs to a dual channel plus or minus direction switch 52 which establishes the energization threshold levels $A_5$ and $A_6$ of relays SQP and SQM, respectively.

The energization circuit for relay SAS is completely through a single channel plus and minus amplitude switch 53 which has an input connected directly across the first rotor winding 36. The switch 53 completes the energization circuit for the relay SAS whenever the discriminated signal 41 from the winding 36 rises above the threshold level $A_1$ or falls below the threshold level $A_4$.

Figure 15:
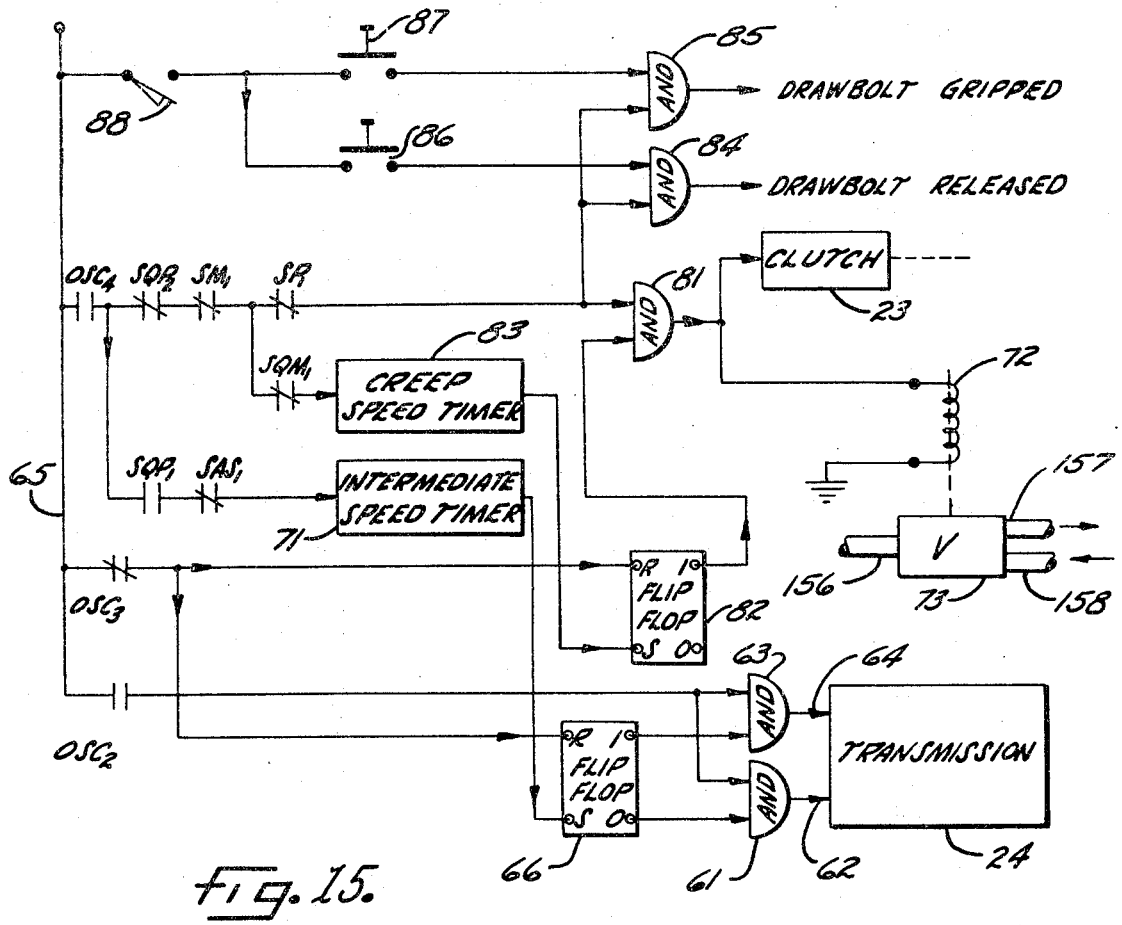
FIG. 15 is partly a schematic and partly a block diagram to illustrate the output circuit of the control system.

After the spindle orient command has been received to provide the desired two step spindle speed reduction and the delayed actuation of the spindle locking mechanism, the unique responses of the band detector are supplied to a logic circuit shown in FIG. 15 for determining (1) when an intermediate spindle speed has been reached, (2) when the spindle creep speed has been reached, and (3) when the spindle is in the predetermined orientation position. The logic circuit controls the spindle transmission 24 and includes a first normally disabled "AND" gate 61 which energizes the intermediate speed input 62 of the transmission when enabled, a second normally disabled "AND" gate 63 which energizes the creep speed input 64 of the transmission when enabled and sequencing means to enable the intermediate speed gate 61 responsive to the spindle orient command and to disable the intermediate speed gate and enable the creep speed gate 63 responsive to spindle rotation at the intermediate speed.

Referring more specifically to the sequencing of the transmission, one input of each of the "AND" gates 61 and 63 is connected to an appropriate source of logic voltage (not shown) through a normally open contact set $OSC_2$ and a line 65. The other inputs of the gates 61 and 63 are connected to the reset and set outputs, respectively, of a bistable circuit 66, the circuit 66 typically being a conventional flip-flop. When the machine tool is operating in a machining mode, the flip-flop 66 is reset by a signal supplied from the line through a normally closed contact set $OSC_3$. Therefore, when the spindle orient command is given to energize the relay OSC (not shown) thereby transferring the contacts $OSC_{1-4}$, the intermediate speed "AND" gate is enabled to actuate the transmission 24 for spindle rotation at the intermediate speed. The transfer of the contacts $OSC_4$ to a closed state conditions an intermediate speed checking circuit as well as a creep speed checking circuit and an orientation position sensing circuit.

To utilize the unique response of the band detector to rotation through the band about 180 degrees to check for rotation at least as slow as the predetermined intermediate speed, the intermediate speed checking circuit includes a timer 71 which is energized through a normally open contact pair $SQP_1$ and a normally closed contact set $SAS_1$. These contacts are controlled by the relays SQP and SAS, respectively, and thus provide a pulse to the timer 71 which is proportional in duration to the spindle rotational speed through the band about the 180 degree check point. The intermediate speed timer 71, which may be of known construction, response to an input pulse of sufficient duration to indicate spindle rotation at least as slow as the intermediate speed by providing a set signal to the flip-flop 66 to disable the intermediate speed gate 61 and enable the creep speed gate 63. As a consequence, as soon as spindle rotation at least as slow as the intermediate speed is sensed, the transmission creep speed input 64 is energized.

A transmission suitable for control by the logic circuitry of FIG. 15 is described in the copending application of McCann et al., Ser. No. 232,339, filed Oct. 17, 1962, now Pat. No. 3,290,962 and assigned to the assignee of this application. The transmission there disclosed has a number of relay groups each energizable to provide spindle rotation at a predetermined speed. When such a transmission is used, the inputs 62 and 63 are each connected to energize an appropriate set of relays.

(b) Spindle rotary position sensing

In order to translates the band detector signal produced responsive to spindle position within the orientation band to a signal in suitable form to declutch the transmission and energize the spindle locking mechanism, the spindle orienting portion of the logic circuit includes an orientation position sensing means herein shown as a circuit formed by the normally closed contacts $SQP_2$, $SM_1$, and $SP_1$ which are positioned to be opened by the energization of relays SQP, SM and SP, respectively. Consequently, the orientation position sensing circuit is in practical effect a normally open circuit which is closed during the spindle orienting mode of operation to provide an orient signal when the spindle is in the orientation position.

To bring the spindle to rest in the orientation position, the clutch 23 and a solenoid coil 72 are simultaneously energized. Energization of cutch 23 declutches the transmission 24 while energization of the solenoid coil 72 conditions a hydraulic valve 73 to supply pressure fluid to force a shotpin 74 (FIG. 4) into a bore 75 in a positioning ring 76 which is rotationally anchored to the spindle 21.

(c) Spindle rotary speed sensing

To delay actuation of the spindle locking mechanism and disengagement of the press clutch until the spindle has slowed at least to the creep speed to thereby limit the maximum shock attendant to spindle orientation to a level where the spindle and the locking mechanism will not be damaged, the orient signal developed by the logic circuit is supplied to one input of an "AND" gate 81 and the other input of the gate is connected to the set or "1" output of a bistable circuit 82 which may typically be a flip-flop. During the maching mode of operation, flip-flop 82 is reset by a signal supplied to its reset input from the line 65 through the normally closed contact set $OSC_3$, and it remains reset until the spindle slows at least to the creep speed. To condition the locking mechanism for actuation when the spindle has slowed to the creep speed, the set input of the flip-flop 82 is connected to the output of the creep speed checking circuit. This circuit includes the normally closed contacts $SQP_2$, $SM_1$ and $SQM_1$ which convert the band detector response to spindle rotation through the creep speed checking point to a pulse, and a pulse timer 83 to provide a set pulse to the flip-flop in response to a pulse through the relays $SQP_2$, $SM_1$ and $SQM_1$ of sufficient duration to indicate that the rotational speed of the spindle is at least as low as the creep speed.

(3) Drawbolt rotary position sensing

In accordance with another important aspect of this invention, the transducer means, which is used to represent spindle rotary position during the spindle orientation operation, is also used to represent drawbolt rotary position during the drawbolt operation cycles. In the present case, the band detector and rotary position sensing portion of the logic circuit are utilized to provide a definite drawbolt malfunction indication whenever the drawbolt is not correctly positioned for either releasing or gripping. To this end, the logic circuit is constructed to provide a pair of signals; one of which is present only if the drawbolt actuator properly rotates the drawbolt during the tool releasing phase of the tool change cycle and the other of which is present only if the drawbolt actuator provides proper drawbolt rotation during the tool gripping phase. Thus, the absence of either of these signals at appropriate points in the tool change cycle may be used by means (not shown) to activate an operator alarm (not shown) and to automatically shut down the machine tool.

Thus, one of the features of the present invention is the utilization of the same circuitry to provide the dual functions of spindle orientation and drawbolt control, thus reducing the expense and complexity of the control system. As noted above, the drawbolt 26 is the type which is rotated in one direction through substantially 45 degrees with respect to the spindle 21 to release a worktool and is rotated back in the other direction through the same angle to grip a worktool. Since the transducer means is connected to the drawbolt 26 it is effective to represent spindle rotary position when the spindle is rotating and, when the spindle is in the known orientation position, it is effective to represent drawbolt rotary position relative to the known position of the spindle. As herein shown, the second resolver stator input winding 35 (FIG. 10), is displaced from the first input winding by substantially 90 degrees and is connected across the sine output of the transformer 33 through a normally open contact pair $PDBR_1$. This arrangement permits the use of the band detector and logic circuit to provide the signals indicating drawbolt position.

Specifically, when the spindle has been oriented and it is desired to initiate a tool change cycle, a relay (not shown) is energized to close the contacts $PDBR_1$. As a result, the deadband uniquely identified by the simultaneous de-energization of the relays SQP, SM and SP is shifted forward by substantially 45 degrees from the spindle orientation position. Consequently, the contacts $SQP_2$, $SM_1$ and $SP_1$ are simultaneously closed during the tool releasing phase of the tool changing cycle only after the drawbolt has properly rotated through 45 degrees relative to the spindle. In a similar manner, in order to provide the desired signal to indicate that the drawbolt has rotated back to grip the newly presented tool, the relay is de-energized after the drawbolt released signal has been supplied. Consequently, the drawbolt must rotate back to its initial rotary orientation relative to the spindle before the contacts $SQP_2$, $SM_1$ and $SP_1$ are again simultaneously closed.

The contacts $SQP_2$, $SM_1$ and $SP_1$ are connected to provide both the drawbolt gripped and released signals to one input of each of a pair of "AND" gates 84 and 85. To distinguish between these signals the other input of the gate 84 is connected to a switch 86 which is closed, either manually or automatically, during the tool release phase of the drawbolt operation while the other input of the gate 85 is connected to a switch 87 which is closed during the toop grip phase of the drawbolt operation. As a result, the gates 84 and 85 serve as detectors to provide drawbolt released and gripped signals, respectively.

In order to prevent the appearance of either a drawbolt gripped or released signal if the shotpin 74 is not properly engaged in the positioning ring bore, a switch 88, which is closed responsive to engagement of the shotpin, is connected between the line 65 and the switches 86 and 87. Thus, if the shotpin is not properly engaged neither of the gates 84 and 85 may be enabled.

Having described the present invention in general, certain more specific details of the machine tool and control system will now be described.

Spindle

Referring to the headstock 101 shown in FIG. 1, which should be understood to serve merely as environment with which the previously described control system finds particular, but not exclusive utility, the headstock shown is fully disclosed in the copending applications of Jesse Daugherty, Ser. No. 386,272 and 569,532, filed on July 30, 1964 (now abandoned) and Aug. 1, 1966 (now Pat. No. 3,311,024) respectively, and assigned to the assignee of this application. Reference is made to those applications for the specific details of the construction and mode of operation of the headstock.

For present purposes, it will suffice to note that the headstock has an extensible power driven spindle 21 rotatably and translatably supported in a headstock housing 102 by a spindle sleeve 103. To enable the spindle to receive and drive a worktool carried by a toolholder 25, the outer end portion of the spindle 21 is formed with a flared socket 104 which is complementary to the tapered shank 105 of the toolholder 25 and also with a pair of circumferentially opposed keys 106 which mate with a corresponding pair of keyways 107 in the toolholder.

In the particular machine tool shown, the spindle is fixed for machining, although the control system is suitable for use with other machine tool types. When the machine tool is operating in a machining mode, the spindle 21 is clamped within the sleeve 103 so that driving torque is applied thereto by the motor 22 through the clutch 23, the transmission 24, and a ring gear 108. The clamping mechanism can be seen in FIG. 2 to include a collar 111 which is anchored in the spindle sleeve and which includes at one end yieldable fingers 112 which closely surround the spindle 21. Disposed in a cavity formed in the sleeve 103 are two respectively concentric stacks of slightly dished springs 113 and 114 which slope oppositely from an intermediate ring 115 to define an annular toggle mechanism.

During the machining mode of operation, the spring stacks tend to be flattened by an axial force applied to the ring 115 through a force transmitting rod 116. Thus, radial forces are developed which cause the yieldable fingers 112 to firmly lock the spindle 21 within the sleeve 103.

Since it is desirable that the spindle not only be clamped within the sleeve during the machining mode, but also that it be axially translatable with respect to the sleeve during a non-machining mode of operation so that its longitudinal projection from the sleeve may be adjusted either for various machining operations or to enable it to effectively cooperate with automatic tool change apparatus, means are provided for releasing the spindle clamp. However, the release mechanism provided is effective only when the spindle and sleeve are brought to rest in a predetermined angular position. This limitation on the operation of the clamp release mechanism insures that the spindle will have the same angular orientation every time a worktool is supplied thereto or taken therefrom thereby protecting a cut from disfiguration by the return of a tool thereto with a different angular orientation than it had when it was taken therefrom.

As shown in FIGS. 2 and 3, this clamp release mechanism includes, externally of the headstock, a channelled plunger 121 slidable within a cylinder 122 and, internally of the headstock, a piston 123 and a passage 124 through sleeve 103 from behind the piston to a port 125. To release the spindle clamp, the sleeve is brought to rest in the angular position where the port 125 aligns with the plunger channel 126 and pressure fluid is admitted from a supply (not shown) through a port 127 into the cylinder 122. The pressure fluid forces plunger 121 into sealing engagement with a flattened seat 128 provided on the sleeve 103 to complete a path through the plunger channel 126 and the passage 124 from the pressure supply to behind the piston 123. As a result, the ring-like nose 131 of the piston is thrust against the ring 115 with sufficient force to overcome the opposing force applied by the force transmitting rod 116. Accordingly, the spring stacks 113 and 114 relax to release the spindle 21 from the sleeve 103. To re-clamp the spindle, the pressure behind the piston 123 is vented through the connected passages 124 and 126.

Referring back to FIG. 1, the mechanism for axially translating the spindle when the latter is unclamped includes a ram 141 which is mounted in the housing 102 for axial but not rotational movement. The ram is selectively driven by a differential hydraulic actuator shown schematically at 142 to include a piston 143 which is controlled by operation of desired ones of the multiple valves 144. The linear motion of the piston 143 is amplified and translated to the ram through a double rack and pinion arrangement which includes a first rack 145 carried by the ram 141, a second rack 146 fixed to the headstock housing 102, and a pinion 147 journalled on the piston 143 and meshed with both of the racks 145 and 146. As will be understood by those skilled in the art, the extent of the axial movement of the ram is controlled by the combination of valves operated at any one time. The ram 141 is provided with a pair of annular shoulders 148 and 149 through which its longitudinal movement is imparted to the spindle 21 (FIG. 7).

Figure 4:
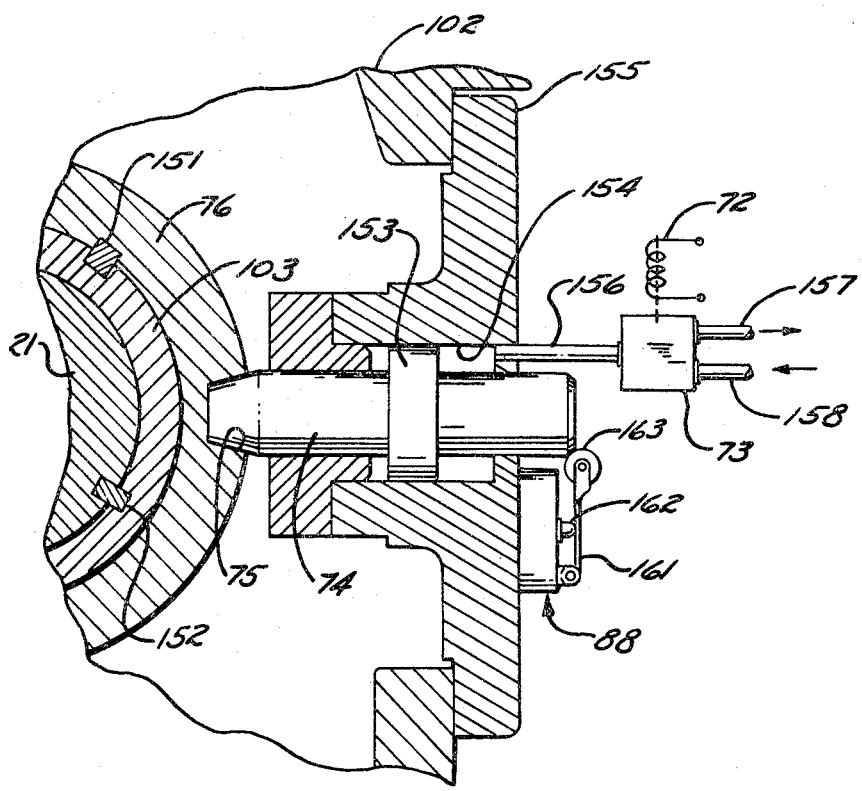
FIG. 4 is a fragmentary section taken along the line 4—4 of FIG. 1 to show the mechanism for locking the spindle in a desired rotary orientation position.

The spindle locking mechanism can be seen in FIGS. 1 and 4 to include the hydraulically actuated shotpin 74 and the positioning ring 76, the latter being rotationally anchored to the spindle by the keys 151 and 152. The shotpin includes a piston portion 153 which is slidably mounted in a cylinder 154. To maintain the shotpin in longitudinal alignment with the positioning ring, the cylinder 154 is fixed to the headstock housing 102 by a bracket 155.

The shotpin 74 is normally biased to a retracted position by a spring or the like (not shown) and is thrust into the positioning ring bore 75, which is located to be radially aligned with the shotpin when the spindle is in the rotary orientation position, to arrest spindle rotation. To operate the shotpin in this manner, the solenoid controlled three way valve 73 is connected so that the outlet line 156 is normally in communication with the exhaust line 157. However, upon energization of the solenoid coil 72, the valve 73 shifts to establish communication between the pressure line 158 and the outlet line 156. Consequently the energization of the coil causes pressure fluid to be admitted behind the piston portion of the shotpin to force the shotpin into the positioning ring bore.

To obtain the indication of the operation of the spindle locking mechanism previously described with reference to the switch 88, the switch is mounted on the bracket 155 and has a control arm 161 which is spring biased at one end toward a switch actuating plunger 162. The other end of the control arm carries a follower 163 which rides on the butt end of the shotpin so that the control arm is lifted away from the switch actuating plunger when the shotpin is in the retracted position. However, when the shotpin is engaged as shown in FIG. 4, the bias applied to the control arm 161 causes the arm to depress the plunger 162 to thereby close the switch. Thus, the electrical condition of the switch 88 provides a positive indication of the condition of the shotpin.

Power drawbolt

For the purpose of rapidly and effectively securing a tool carried by the toolholder 25 to the spindle and for releasing it therefrom, a power drawbolt assembly, which includes the tool-engaging drawbolt 26 and a drawbolt actuating mechanism 27, is provided.

Figure 6:
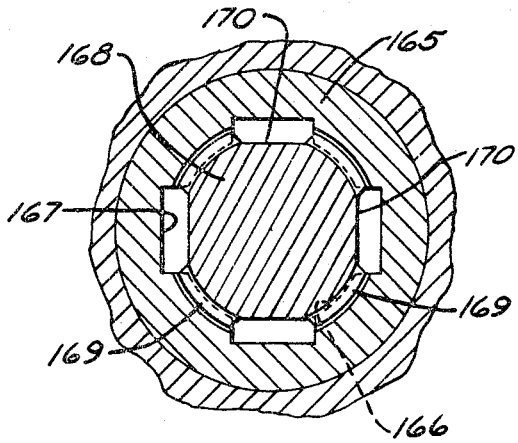
FIG. 6 is a fragmentary section similar to FIG. 5 but showing the drawbolt and toolholder fully engaged.

Positive engagement and disengagement between the toolholder and drawbolt are afforded by a breech lock connection therebetween as shown in FIGS. 5 and 6. To provide this connection, the end portion 165 of the toolholder is formed with a bore having four circumferentially spaced threaded lands 166 respectively separated by longitudinal grooves 167. In a complementary manner, the tool engaging end 168 of the drawbolt is formed with four segmental lands 169 mutually separated by longitudinal grooves 170. This arrangement permits the toolholder and drawbolt to be engaged by axial insertion of the tool engaging end of the drawbolt into the toolholder bore followed by rotation of the drawbolt through 45 degrees and the subsequent axial tensioning thereof. It also permits disengagement of the toolholder and drawbolt by a reversal of the above steps with the additional step of an axial thrust to break the frictional contact between the spindle and the toolholder shank.

Drawbolt actuation

The drawbolt drive necessary to perform these tool engaging and disengaging steps is provided by the drawbolt actuating mechanism 27 which includes two sequentially operated, rotary hydraulic motors 173 and 174 separated by a generally cylindrical spacer 175.

Referring to FIG. 8, the motor 173 comprises a stator 176, a vane-type rotor 177 and a pair of end caps 178 and 179 (FIG. 7) secured together by circumferentially spaced retaining screws 181. The motor 173 is directly connected with the drawbolt 26 through longitudinal splines in the bore of the rotor 177 which mate with the longitudinal splines on a splined portion 182 of the drawbolt. As shown in FIG. 9, the motor 174 comprises a stator 184, a vane-type rotor 185 and a pair of end caps 186 and 187 (FIG. 7), the assembly being completed by a number of circumferentially spaced retaining screws 188. A lost motion connection is formed between the drawbolt 26 and the motor 174 by a nut 191 which has a splined connection on its outer periphery with the rotor 185 and a threaded connection in its bore with a complementarily threaded portion 192 (FIG. 7) of the drawbolt. In order to permit the drawbolt to rotate with the spindle during the machining mode of operation, the stators of the motors 173 and 174 and the partition 175 are secured to a sleeve 193 by means such as assembly screws 194 which can be seen in FIGS. 8 and 9. The sleeve 193 is secured to the spindle typically through a key-type connection (not shown).

The hydraulic circuit of the drawbolt actuating mechanism 27 includes a pair of passages 195 and 196 which longitudinally extend through the non-rotatable ram 141 and which communicate with a fluid supply T through a four-way, two-position solenoid controlled hydraulic valve 197 and a pair of flexible conduits 198 and 199. The operation of the valve 197 is such that in one position, the conduit 198 is connected to the pressure side of an appropriate source, such as the output of a motor driven pump P and the conduit 199 is connected to drain, typically back to tank T. In the other valve position, the conduit 199 is connected to the pressure side of the source while the conduit 198 is connected to drain.

In order to separate the rotated and non-rotated portions of the hydraulic circuit during the machining mode of operation and yet to provide a fluid tight seal therebetween during drawbolt actuating cycles, the ram passages 195 and 196 are both provided with normally retracted sealing members. To this end, the passage 195 has a laterally enlarged portion housing a slidable plunger 201 which has a longitudinal channel 202 therethrough in communication with the passage 195. The plunger has a spring 203 at one end to bias it away from the rotatable portion of the drawbolt actuating mechanism 27 and a normally closed check valve 204 at the other end. Likewise, the passage 196 has a laterally enlarged portion slidably housing a plunger 205. Like the plunger 201, the plunger 205 has a longitudinal channel 206 in communication with the passage 196, a spring 207 at one end to urge it away from the drawbolt actuating mechanism 27, and a normally closed check valve 208 at the other end.

During joint rotation of the spindle 21 and actuating mechanism 27 incident to a machining mode of operation, both of the main fluid passages 211 and 212 through the mechanism 27 are open to drain. However, when the spindle is brought to rest in the fixed orientation position, the passages 211 and 212 are aligned with the plunger channels 202 and 206, respectively, as shown in FIG. 7. A drawbolt gripping or releasing cycle may then be initiated. For example, with the drawbolt actuating mechanism 27 in the position shown in FIG. 7, actuation of the solenoid valve 213 to connect the passage 195 to the pressure side of the supply will initiate a drawbolt gripping cycle.

The application of pressure fluid to the passage 195 overcomes the effect of the bias spring 203 and forces the plunger 201 into sealing engagement with the mechanism 27. Continued application of the pressure fluid opens the check valve 204 to permit the pressure fluid to pass through the channel 202 and passage 211 to the annular passage 214 in the stator 176 of the motor 173. From there, the fluid travels via a pair of ports 215 and 216 into the rotor chambers 217 and 218 (FIG. 8). The rotor chambers 221 and 222, which lie on the other sides of the vane of the rotor 177, are connected to drain via a pair of ports 223 and 224, an annular passage 225, and the main fluid passage 212.

Under these conditions, the rotor 177 of the motor 173 will rotate clockwise (as viewed in FIG. 8) through an angle of substantially 45 degrees. Due to the splined connection between the rotor 177 and the drawbolt 26, the drawbolt rotates with the rotor to effect engagement between the threaded toolholder lands 166 and the complementary threaded drawbolt lands 169 as shown in FIG. 6.

Interlock means (not shown) are provided which, during the drawbolt gripping cycle, prevent activation of the motor 174 until after the motor 173 has been energized. Reference is made to the aforementioned copending application, Ser. No. 569,532, now Pat. No. 3,311,024 for a full disclosure of these interlocking means. For the purpose of understanding the present invention, it is sufficient to know that after the motor 173 is energized, pressure fluid flows via a pair of ports 226 in the motor 173 (only one port being visible in FIG. 7) and an annular passage 227 in the end cap 179 to a longitudinal passage 228 which is isolated from the passage 211 by a check valve 229. The fluid then enters the rotor chambers 231 and 232 of the motor 174 through an annular passage 233 and a pair of ports 234 and 235. The rotor chambers 236 and 237 are connected to drain through a couple of ports 238 and 239, an annular passage 241 and the longitudinal passages 242 and 212.

This hydraulic circuit causes the rotor 185 of the motor 174 to rotate counterclockwise (as viewed in FIG. 9) through an angle of about 112 degrees, and this rotation is transferred to the nut 191 through its splined connection with the rotor 174. The counterclockwise rotation of the nut tensions the drawbolt by causing it to shift axially to the right as viewed in FIG. 7.

In a similar manner, a drawbolt release cycle may be initiated by activating the solenoid 213 to pressurize the passage 196 while connecting the passage 195 to drain. Reference is made to the above-identified copending application Ser. No. 569,532 for a description of the hydraulic circuits which are established under these conditions and for the interlock means which prevent activation of the motor 173 until after the motor 174 has been energized.

For present purposes it suffices to note that pressure fluid is introduced into the rotor chambers 236 and 237 to cause the rotor 185 of the motor 174 to rotate clockwise back to the position shown in FIG. 9 to release tension on the drawbolt 26 and to further cause the nut 191 to move to the right (FIG. 7) to impact upon the spacer 175. This impact produces an axial thrust that acts upon the drawbolt to break the frictional contact between the spindle socket 104 and the toolholder shank 105 (FIG. 1). Subsequent to the activation of the motor 174, the motor 173, is energized by pressure fluid introduced into the rotor chambers 221 and 222 which causes the rotor 177 to rotate counterclockwise substantially 45 degrees back to the position shown in FIG. 8. This counterclockwise rotation is imparted to the drawbolt to effect disengagement between the threaded toolholder lands 166 and the threaded drawbolt lands 169. At this time, the drawbolt is positioned for acceptance of a new worktool which may be presented thereto either by hand, or preferably, by automatic tool change equipment. After the presentation of the new worktool, the solenoid 213 may again be energized to initiate a drawbolt gripping cycle previously described.

Transducer mounting

As stated in the general description of the invention, the band detector is actuated by the output of a rotary position transducer, typically illustrated as the two-phase, rotary resolver 28, which is responsive to the rotation of the drawbolt. This transducer is mounted on the headstock 101 by a bracket 251 which is piloted in a bore formed in the ram 141 and which is secured to the ram through circumferentially spaced fasteners (not shown). The transducer stator windings 34, 35 are fixed in position and supported by the headstock, while the transducer rotor windings 36, 37 are rotated by the drawbolt 26 to give the requisite representation of drawbolt and spindle position. Specifically, in the present case, the drawbolt extension shaft 29 is pinned at one end to the drawbolt 26 for joint axial and rotational movement therewith and has a splined connection at its other end with a coupling sleeve 252 for rotation therewith and axial movement with respect thereto. The sleeve 252 is rotatably supported in the bracket 251 coaxially with the resolver and drawbolt extension shaft by a pair of bearings 253 and 254. To complete the mechanical information link between the drawbolt and resolver, the sleeve 252 is pinned to a stub shaft 255 which, in turn, has an internal splined connection with one end of a flexible coupling 256. The other end of the coupling 256 carries the rotor 31 of the resolver 28 (FIG. 10). Since the drawbolt 26 rotates with the spindle 21 during the machining mode of operation, the rotary position of the rotor 31 provides mechanical information as to the instantaneous rotary position of the spindle. This information is converted to electrical form and utilized as before described.

Control system circuits (1) Band detector discriminators

A suitable circuit for the discriminators 43 and 44 is shown in FIG. 11. In the interest of brevity, the operation of the discriminator will be described with reference to the discrimination of the signal produced across the rotor winding 36. It shall be understood that a similar description applies to the discrimination of the signal produced across the other rotor winding 37. The discriminator includes a pair of input transformers 261 and 262 and a pair of rectifier bridges 263 and 264. The primary winding 265 of the first input transformer 261 receives the signal produced across the rotor winding 36 and transforms this signal in phase to the secondary winding 266 and with the phase reversal indicated by the dot notation to the secondary winding 267. The primary winding 268 of the second transformer 262 receives a reference signal identical in frequency and amplitude to the signal appearing across the cosine output of the transformer 33 from a suitable reference source (not shown) and transforms this signal to secondary winding 269. The reference signal appearing across the secondary winding 269 is connected across the opposite terminals 271 and 272 of the bridge 263 through dropping resistors 273 and 274. Likewise, it is connected across the opposite terminals 275 and 276 of the bridge 264 through dropping resistors 277 and 278. To maintain circuit balance, the dropping resistors 273, 274, 277 and 278 are mutually equal in value. The terminal 281 of the bridge 263 is connected in common to one side of the secondary 266 and to an output terminal 282. Similarly, the terminal 283 of the bridge 264 is commonly connected to one side of the secondary 269 and to another output terminal 284. The discriminator circuit is completed by the connection of the other side of the secondary 266 to a terminal 284 of the rectifier 264 and the connection of the other side of the secondary 267 to a terminal 286 of the rectifier 263.

With the discriminator circuit established as described, the first discriminator output signal appearing between the terminals 282 and a common 287 is of the form $E \sin \phi_a = 0$ to 180 degrees, and the second discriminator output signal appearing between the terminal 284 and common 287 is of the $E(-\sin \phi_6)$ where $\phi_6 = 180$ to 360 degrees.

(2) Plus or minus direction switch

A suitable direction switch for controlling the operation of the relays SP and SM or SQP and SQM is shown in FIG. 12. Its operation will be described in connection with the relays SP and SM, a similar description applying to its operation in controlling the relays SQP and SQM.

The plus or minus direction switch has a pair of channels each including a thyratron, 291 and 292, respective. Thyratrons 291 and 292 have their grid-cathode input circuits coupled across the first and second discriminator outputs, respectively, and their anode-cathode firing circuits connected across a suitable A.C. energizing source (typical 60 c.p.s., 110 v.) through the relays SP and SM, respectively. To establish the firing threshold level $A_2$ (FIG. 14), the thyratron 291 is biased by the signal developed between the slider 293 of a potentiometer 294 and the common 287. Likewise, to establish the threshold level $A_3$, the thyratron 292 is biased by the signal developed between the slider 295 of a potentiometer 296 and the common.

(3) Amplitude switch

Figure 13:
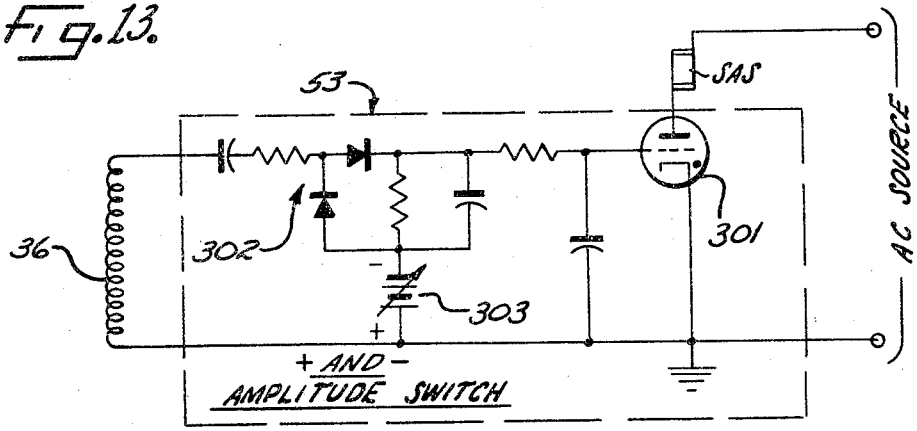
FIG. 13 is a circuit diagram of the plus and minus amplitude switch shown in FIG. 10.

A circuit suitable for use as the amplitude switch 53 of FIG. 10 is shown in FIG. 13 to include a thyratron 301 with its grid-cathode control circuit connected across the rotor phase winding 36 and its anode-cathode circuit connected across a suitable A.C. source (typically 60 c.p.s., 110 v.) through the relay SAS. To energize the relay SAS whenever the voltage across the winding 36 rises above the threshold level $A_1$ or falls below the threshold level $A_4$, the thyratron grid-cathode circuit includes a diode network 302 and a bias source 303. The bias source determines the firing threshold levels while the diode network prevents the relay SAS from falling out on the negative half cycle of the signal produced across the winding 36.

From the foregoing, it will be apparent that the control system of the present invention is capable of both automatically arresting spindle rotation in a predetermined rotary orientation position and sensing any failure of the drawbolt to rotate properly during the tool changing or the like. Additionally, it will be clear that by delaying actuation of the spindle locking mechanism until the spindle has slowed to a relatively low creep speed, the control system protects the spindle and spindle locking mechanism against the damaging effects which might accompany actuation of the locking mechanism during spindle rotation at the relatively high speeds frequently encountered in machining. Moreover, it will be understood that the two-step spindle speed reduction procedure provided by the control system substantially reduces the average time required to stop the spindle and, thus, reduces lost machining time incident to tool changing or other adjustments of the machine tool as compared with a single step slowdown procedure wherein the spindle is decelerated to a creep speed and is rotated at that speed to the orientation position. With either procedure, the spindle will be at an undedetermined, random position as the creep speed is reached. Following a one-step procedure, the average time to stop the spindle must account for rotation at the creep speed from possible positions more than a full revolution away from the orientation position since the spindle positon after deceleration may be so close to the desired orientation position that the controls and mechanical arresting means are incapable of stopping the spindle during the first pass.

With the two-step speed reduction of this invention, on the other hand, the spindle is rotated at the faster intermediate speed to the intermediate speed checking point, illustratively 180° ahead of the orientation position, such that the spindle is rotated for a substantially shorter period at the creep speed rate resulting in a shorter average time for stopping the spindle. It will be seen that this advantage is greater using higher intermediate speeds. Using intermediate and creep speed rates of 24 r.p.m. and 12 r.p.m., respectively, the maximum orientation time will be more than two seconds less than the maximum orientation time with a one step reduction to a creep speed of 12 r.p.m. With a two step reduction using a 48 r.p.m. intermediate speed and a 12 r.p.m. creep speed, the maximum orientation time will be 2½ seconds less than maximum orientation time of the one step reduction to 12 r.p.m. creep speed. Because of the effect of the spindle momentum, in practice even more substantial time savings will be achieved using the two step speed reduction.

I claim:

1. A command activated control system for a machine tool having a spindle, a motor for rotating said spindle, and a spindle rotation arresting mechanism, said control system comprising transducer means rotated with said spindle and activated by a spindle orient command for providing an output representative of the rotational speed of said spindle, and means for actuating said spindle arresting mechanism responsive to the spindle orient command including speed sensing means responsive to the output of said transducer means for preventing actuation of said arresting mechanism when the spindle rotational speed is above a predetermined creep speed to thereby limit the shock attendant to arresting spindle rotation.

2. The control system of claim 1 wherein said machine tool further includes a drawbolt which is rotatable with said spindle and, when said spindle is at rest, relative to said spindle through a predetermined angle; wherein said transducer means is mounted for rotation with said drawbolt; and further including supply means connected to said transducer means and operable subsequent to the actuation of said arresting mechanism to provide a distinctive transducer output when said drawbolt has rotated through said angle, and drawbalt malfunction sensing means connected to be energized responsive to said distinctive output.

3. A command activated control system for a machine tool having a spindle, a motor for rotating said spindle, and an electrically actuable spindle rotation arresting mechanism, said control system comprising transducer means coupled for rotation with said spindle and activated by a spindle orient command for providing an output which has one electrical characteristic which indicates the rotational speed of said spindle and another electrical characteristic which uniquely identifies substantial correspondence between the rotary position of said spindle and a predetermined spindle orientation position, a speed sensing circuit connected to condition said arresting mechanism for actuation responsive to an indication by said first characteristic that the spindle rotational speed is below a predetermined creep speed so as to limit the shock attendant to arresting spindle rotation, and orientation position sensing means connected for actuating the conditioned arresting mechanism responsive to said second characteristic so as to bring said spindle to rest in said orientation position.

4. The control system of claim 3 wherein said transducer means provides an output which varies in amplitude as a function of the instantaneous rotary position of said spindle and in frequency as a function of the rotational speed of said spindle; and further including an electrically controllable multi-speed transmission which is coupled between said motor and said spindle and which has one input which is energizeable to provide spindle rotation at a predetermined intermediate speed and another input which is energizable to provide spindle rotation at said creep speed, an electrically disengageable clutch coupled between said motor and said transmission, a band detector connected to receive the output of said transducer means for providing an intermediate speed checking signal which is durationally proportional to the spindle rotational speed through a band of predetermined width about an intermediate speed checking point, a creep speed checking signal durationally proportional to spindle rotational speed through a band of predetermined width about a creep speed checking point, and an orientation signal responsive to spindle rotation through a predetermined band about a spindle orientation position, first and second AND gates having a respective pair of inputs and respective outputs connected to said one and said other transmission inputs, means responsive to the spindle orient command for energizing one input of each of the first and second gates, a bistable circuit having a reset output connected to the other input of said first gate and a set output connected to the other input of said second gate, means for resetting said bistable circuit prior to said command so that said one transmission input is energized responsive to said command, an intermediate speed timer responsive to said intermediate speed checking signal and connected to set said bistable circuit when the spindle rotational speed is at least as low as said intermediate speed to thereby de-energize said one transmission input and energize said other transmission input, a third AND gate having an output connected to actuate said arresting mechanism and disengage said clutch and a pair of inputs, a creep speed timer responsive to said creep speed checking signal and connected to energize one input of said third gate when the rotational speed of said spindle is at least as low as said creep speed to thereby limit the shock attendant to arresting rotation of said spindle, and an orientation position sensing circuit connected for energizing the other input of said third gate responsive to said orientation signal so as to arrest spindle rotation in said orientation position.

5. The control system of claim 3 wherein said transducer means provides an output which varies in amplitude as a function of the instantaneous rotary position of said spindle and in frequency as a function of the rotational speed of said spindle; and further including a band detector connected to receive the output of said transducer means for providing an intermediate speed checking signal which is durationally proportional to the spindle rotational speed through a band of predetermined width about an intermediate speed checking point, a creep speed checking signal durationally proportional to spindle rotational speed through a band of predetermined width about a creep checking point, and an orientation signal responsive to spindle rotation through a predetermined band about a spindle orientation position, and means connecting said speed sensing circuit and said orientation position sensing means for operation responsive to said signals.

6. The control system of claim 3 further including means operated responsive to said transducer output for successively reducing the speed of said spindle to intermediate and creep speed rates and for actuating said arresting mechanism after rotation of said spindle at least as slow as said creep speed rate through a predetermined angle less than one spindle revolution.

7. The control system of claim 3 wherein said transducer means provides an output signal which varies in amplitude as a function of the instantaneous rotary position of said spindle and in frequency as a function of the rotational speed of said spindle; and further including an electrically controllable multi-speed transmission which is coupled between said motor and said spindle and which has one input which is energizeable to provide spindle rotation at a predetermined intermediate speed and another input which is energizable to provide spindle rotation at said creep speed, and means including said speed sensing circuit and operated responsive to said transducer means output signal frequency characteristic for energizing said transmission to reduce the speed of said spindle successively to said intermediate and creep speeds.

8. A drawbolt malfunction sensing system for a machine tool having a spindle, a motor for rotating said spindle, and a drawbolt which is rotatable with said spindle and which, when said spindle is at rest, is rotatable relative to said spindle in one direction from a gripped position to a released position during a drawbolt releasing cycle and in the other direction from the released position back to the gripped position during a drawbolt gripping cycle, said sensing system comprising transducer means mounted for rotation with said drawbolt, supply means to energize said transducer during the drawbolt releasing cycle to provide a distinctive transducer output when said drawbolt is in said released position and to energize said transducer during the drawbolt gripping cycle to provide said distinctive output characteristic when said drawbolt is in said gripped position, and detector means operable during said releasing cycle to provide a drawbolt released signal responsive to said distinctive characteristic thereby indicating proper drawbolt rotation during the releasing cycle and operable during said gripping cycle to provide a drawbolt gripped signal responsive to said distinctive characteristic thereby indicating proper drawbolt rotation during the gripping cycle.

9. A command activated spindle orienting and drawbolt malfunction sensing control system for a machine tool having a spindle, a motor for rotating said spindle, a drawbolt for securing a worktool in said spindle, an arresting mechanism actuatable for arresting rotation of said spindle, and a drawbolt drive mechanism which permits joint rotation of the drawbolt and spindle for machining and which is actuatable when said spindle is in a predetermined orientation position to sequentially drive said drawbolt through a releasing cycle during which said drawbolt is rotated in one direction through a predetermined angle relative to said spindle from a gripped position to a released position and a gripping cycle during which the drawbolt is rotated in the other direction from the released position to the gripped position, said control system comprising transducer means coupled for rotation with said drawbolt, supply means connected for energizing said transducer means responsive to aspindle orient command, said transducer means being oriented relative to said drawbolt so that it provides a distinctive output characteristic when the spindle is in the orientation position and the drawbolt is in the gripped position, position sensing means connected for actuating said arresting mechanism responsive to said characteristic so as to arrest said spindle in said orientation position, means operable responsive to orientation of said spindle to actuate said drawbolt drive mechanism, phase shifting means conected to said transducer to shift the phase of the transducer output through an angle equal to said predetermined angle during the releasing cycle, first detector means responsive to said transducer output characteristic during the releasing cycle to provide a signal indicating proper drawbolt rotation to the released position, and second detector means responsive to said transducer output characteristic during the gripping cycle to provide a signal indicating proper drawbolt rotation back to the gripped position.

10. In combination with a machine tool having a spindle, a motor for rotating said spindle, a drawbolt for securing a worktool in said spindle, a locking mechanism actuatable for arresting rotation of said spindle, and a drawbolt drive mechanism connected to permit joint rotation of said drawbolt with said spindle and actuatable when said spindle is at rest to sequentially drive said drawbolt through a releasing cycle in which the drawbolt is rotated through a predetermined angle in one direction relative to the spindle from a gripped position to a released position and through a gripping cycle in which the drawbolt is rotated in the other direction from the released position to the gripped position, a command activated control system for actuating said locking mechanism and detecting any failure of said drawbolt to rotate properly comprising transducer means rotatable with said drawbolt and atcivated on command to provide an output representative of the rotary speed of said spindle and of the rotary position of said drawbolt, means connected to actuate said locking mechanism responsive to said command including sped sensing means responsive to the output of said transducer means for preventing actuation of said locking mechanism so long as the spindle rotational speed is above a predetermined creep speed to thereby limit the shock attendant to arresting rotation of said spindle, and means utilizing said transducer output subsequent to actuation of said locking mechanism for sensing failure of said drawbolt to rotate properly.

11. The command activated control system of claim 10 wherein the output of said transducer means has a distinctive characteristic when said spindle is at rest and said drawbolt is in said gripped position; and including means connected to said transducer means for shifting the phase of the output of the transducer means during the releasing cycle through an angle substantially equal to said predetermined angle, first detector means responsive to said distinctive characteristic and operable during the releasing cycle to signal proper drawbolt rotation to the released position, and second detector means responsive to said distinctive characteristic and operable during the gripping cycle to signal proper drawbolt rotation back to the gripped position.

12. The command activated control system of claim 11 wherein the output of said transducer means has a distinctive characteristic when said drawbolt is in said gripped position and said spindle is substantially in said orientation position: and wherein said locking mechanism actuating means further includes gate means having a first input connected to be energized by said speed sensing means when the rotary speed of said spindle is below said creep speed, a second input, and an output connected to actuate said locking mechanism upon the concurrent energization of said inputs, and position sensing means connected to energize the second input of said gate means responsive to said distinctive characteristic of the output of said transducer means whereby said spindle is arrested substantially in said orientation position.

13. The combination of claim 12 wherein the output of said transducer is a signal which varies in amplitude as a function of the instantaneous rotary position of said drawbolt and in frequency as a function of the rotational speed of said spindle; and further including an electrically controllable multi-speed transmission connected between said motor and said spindle for controlling the rotational speed of said spindle and which has one input energizeable for providing spindle rotation at an intermediate speed and another input energizeable for providing spindle rotation of said creep speed, a band detector connected to receive said transducer output for providing respective intermediate and creep speed checking signals responsive to spindle rotation through bands of predetermined width about respective intermediate and creep speed checking points and for providing an orientation signal responsive to spindle positioning within a predetermined band about the spindle orientation position, first and second AND gates each having a pair of inputs and an output, the outputs of said first and second gates being coupled to said one and said other transmission inputs, respectively, means activated by said command for energizing one input of each of said first and second gates, a bistable circuit having a reset output coupled to the other input of said first gate and a set output connected to the other input of said second gate, means connected for resetting said bistable circuit to energize said one transmission input responsive to said command, an intermediate speed timer connected for setting said bistable circuit to de-energize said one transmission input and energize said other transmission input responsive to an indication by said intermediate speed checking signal that the spindle rotational speed is below said intermediate speed, and a supply source; aud wherein said speed sensing means includes a creep speed timer connected to energize the first input of said gate means responsive to an indication by said creep speed checking signal that the spindle rotational speed is below said creep speed, said first detector means includes a third AND gate having one input connected to said position sensing means and another input connected to said supply source during the releasing cycle whereby energization of said third gate indicates proper drawbolt rotation to the released position, and said second detector means includes a fourth AND gate having one input connected to said position sensing means and another input connected to said supply source during the gripping cycle whereby energization of said fourth gate indicates proper drawbolt rotation back to said gripped position.

14. In a machine tool, a rotary machine tool member, a transducer means mounted for rotation with said member and actuatable for producing a continuous signal representing the rotary position of said member, and means coupled to said transducer for utilizing said position representing signal to control a predetermined operation of said machine tool.

15. A machine tool according to claim 14 wherein said last mentioned means includes means connected to said transducer for deriving a signal proportional to the rotary speed of said member from said position representing signal, speed governing means responsive to said speed proportional signal for reducing the rotary speed of said member to a predetermined creep speed, and arresting means responsive to both of said signals for bringing said members to rest in a predetermined rotary position.

16. In a machine tool, a rotatable spindle, a drawbolt which is rotatable with said spindle and which, when said spindle is at rest, is rotatable relative to said spindle in one direction from a gripped position to a released position during a drawbolt releasing cycle and in the other direction from the released position back to the gripped position during a drawbolt gripping cycle, transducer means mounted for rotation with said drawbolt and providing a spindle position representing output when said spindle is rotating and said drawbolt is in said gripped position and a drawbolt position representing output when said spindle is at rest and said drawbolt is in either position, and means for controlling predetermined operations of said machine tool in response to said outputs.

17. A machine tool according to claim 16 wherein the last mentioned means includes control means for arresting the spindle in a predetermined orientation position operated from said spindle position representing output of said transducer means, and means for sensing malfunction of said drawbolt operated from said drawbolt position representing output of said transducer means.

18. A machine tool according to claim 17 further including first command activated input means connected to energize said transducer during joint drawbolt and spindle rotation and during said gripping cycle so that said transducer means provides a distinctive characteristic when said drawbolt is in said gripped position and said spindle is in the orientation position, and second command activated input means connected to energize said transducer during said releasing cycle so that said distinctive characteristic is produced when said drawbolt is in the released position and said spindle is in the orientation position; and wherein said control means includes an orientation position sensing circuit responsive to the distinctive characteristic of the transducer output to operate said spindle arresting means which said spindle is is said orientation position, first detector means operable during said drawbolt releasing cycle and responsive to said distinctive characteristic to detect drawbolt rotation to said released position, and second detector means operable during said drawbolt gripping cycle and responsive to said distinctive characteristic to detect drawbolt rotation back to said gripped position.

19. A machine tool according to claim 14 wherein said last mentioned means includes means for arresting said rotary member and means for actuating said arresting means in response to said signal to bring said rotary member to rest in a predetermined rotary position.

20. A machine tool according to claim 14 wherein said last mentioned means includes detector means coupled to said transducer and responsive to said rotary position representing signal for providing a second signal indicating rotation of said member through a band of predetermined width about a predetermined point in its rotation, timer means coupled to said detector means and responsive to said second signal for providing an output signal representative of the rotation of said member through said band at a speed within a predetermined speed range, and means for controlling a predetermined operation of said machine tool in response to said output signal.

21. The control system of claim 20 further including means coupled to said transducer means for controlling other predetermined operations of said machine tool in response to said rotary position representing signal.

22. A machine tool according to claim 16 wherein the last mentioned means includes means operated from said position representing output of said transducer means for sensing malfunction of said drawbolt.

References Cited

UNITED STATES PATENTS

| | | | |
|---|---|---|---|
| 2,192,437 | 3/1940 | Groene et al. | 82—28.2 |
| 2,338,975 | 1/1944 | Schumacher | 82—28.2 |
| 2,908,357 | 10/1959 | Matlachowsky | 82—28.2 |
| 3,254,567 | 6/1966 | Daugherty | 90—11.1 |
| 2,753,502 | 7/1956 | Kylin | 318—466 X |
| 2,790,280 | 4/1957 | Wilson et al. | 318—466 X |

GIL WEIDENFELD, Primary Examiner

U.S. Cl. X.R.

29—568; 188—180